United States Patent [19]

Jennett

[11] Patent Number: 4,599,210
[45] Date of Patent: Jul. 8, 1986

[54] METHOD OF MOLDING RUBBER ARTICLES AND RUBBER MOLDING MACHINE

[76] Inventor: James A. Jennett, 1550 Kirkwood Dr., Geneva, Ill. 60134

[21] Appl. No.: 650,425

[22] Filed: Sep. 14, 1984

[51] Int. Cl.⁴ .......................................... B29C 45/02
[52] U.S. Cl. .................................. 264/40.5; 264/40.4; 264/40.6; 264/40.7; 264/68; 264/328.4; 425/140; 425/144; 425/149; 425/166; 425/379 R; 425/544; 425/558
[58] Field of Search ................... 264/40.4, 40.5, 40.6, 264/40.7, 107, 68, 328.4; 425/139, 140, 141, 147, 148, 150, 166, 810, 544, 558, 379 R

[56] References Cited

U.S. PATENT DOCUMENTS

| | | | |
|---|---|---|---|
| 3,196,485 | 7/1965 | Battenfeld et al. | 425/810 |
| 3,477,101 | 11/1969 | Fritsch | 264/328.2 |
| 3,776,998 | 12/1973 | Church | 264/328.5 |
| 3,878,285 | 4/1975 | Souffie | 264/68 |
| 3,898,314 | 8/1975 | Church | 264/328.5 |
| 3,937,447 | 2/1976 | Alwes et al. | 264/68 |
| 3,986,804 | 10/1976 | Albright | 264/328.4 |
| 4,089,926 | 5/1978 | Taylor | 264/294 |
| 4,229,395 | 10/1980 | Nagumo et al. | 425/166 |
| 4,427,353 | 1/1984 | Omiya et al. | 425/810 |
| 4,443,175 | 4/1984 | Rose et al. | 264/328.4 |

FOREIGN PATENT DOCUMENTS

| | | | |
|---|---|---|---|
| 56-70927 | 6/1981 | Japan | 264/328.2 |
| 1058325 | 2/1967 | United Kingdom | 264/40.4 |

*Primary Examiner*—Jeffery Thurlow
*Attorney, Agent, or Firm*—Douglas B. White

[57] ABSTRACT

There is provided a hydraulic motor-driven extruder having raw rubber stock fed from coiled continuous strips into the extrusion portion thereof. The extruder includes a screw shaft and housing having decreasing diameter as material is transported toward the discharging extremity thereof. Surrounding this screw extruder there is provided heating bands of controlled temperature to impart additional heat. On discharge from the extruder the prepared rubber is deposited within an expandable cavity for selecting the desired volume of prepared rubber material. Once measured the prepared rubber is lifted from the cavity for insertion into the molding press.

9 Claims, 3 Drawing Figures

METHOD OF MOLDING RUBBER ARTICLES AND RUBBER MOLDING MACHINE

BACKGROUND OF THE INVENTION

This invention relates to improvements in apparatus and method for molding rubber articles and more particularly to means for preparing uncured rubber in order to accelerate the molding process, reduce natural waste, reduce flash and improve product quality and consistency.

Heretofore, uncured rubber was preformed and heated on a warm-up mill before being transferred to the molding press. In order to speed the molding process, the warm-up mill has been placed adjacent to the molding press (U.S. Pat. No. 3,898,314). However, during this warm-up step nonuniform heating occurs. Additionally, the cost and space required by the warm-up mill and the fact that it can not run automatically renders it uneconomical in production.

In the preferred embodiment of the present invention, rubber stock is prepared for molding by plasticizing the raw stock through an extruder to obtain homogenous dispersion and temperature. The extruder utilizes both mechanical compression and electrical heating coils to impart an elevated temperature. Further, while in this plasticized state, an accurate amount of prepared rubber is metered for input to the molding press. With this process production is increased, waste and flash are reduced, and product quality and consistency are improved.

SUMMARY OF THE INVENTION

In the preferred embodiment of the present invention there is generally provided a hydraulic motor-driven extruder having raw rubber stock fed from continuous strips into the extrusion portion thereof. The extruder generally provides a decreasing diameter as material is transported toward the discharging extremity thereof. Surrounding this screw extruder there are provided heating bands of controlled temperature or an equivalent external heat source to further raise the temperature of the rubber. On discharge from the extruder the prepared rubber is deposited within an expandable cavity for selecting the desired volume of prepared rubber material. Once measured the prepared rubber is lifted from the cavity for insertion into the molding press.

Other objects and advantages of the invention will become apparent upon reading the following detailed description and upon reference to the drawings, in which:

FIG. 1 is a front elevational view of a cross section of the apparatus of the present invention in a first phase of operation with no prepared rubber deposited in the measuring cavity;

FIG. 2 is an elevational view and cross section of the lower portion of the apparatus of FIG. 1 in the second phase of operation with a measured amount of prepared rubber in the expandable cavity; and FIG. 3 is an elevational view of the lower part of the apparatus of FIG. 1 in the third phase of the operation with a measured amount of rubber in the expandable cavity, with the expandable cavity in an opened position for removal of the prepared rubber.

While the invention will be described in connection with the preferred embodiment, it will be understood that I do not intend to limit the invention to that embodiment. On the contrary, I intend to cover all alternatives, modifications and equivalents as may be included within the spirit and scope of the invention as defined by the appended claims.

DESCRIPTION OF THE PREFERRED EMBODIMENT

Figure 1:
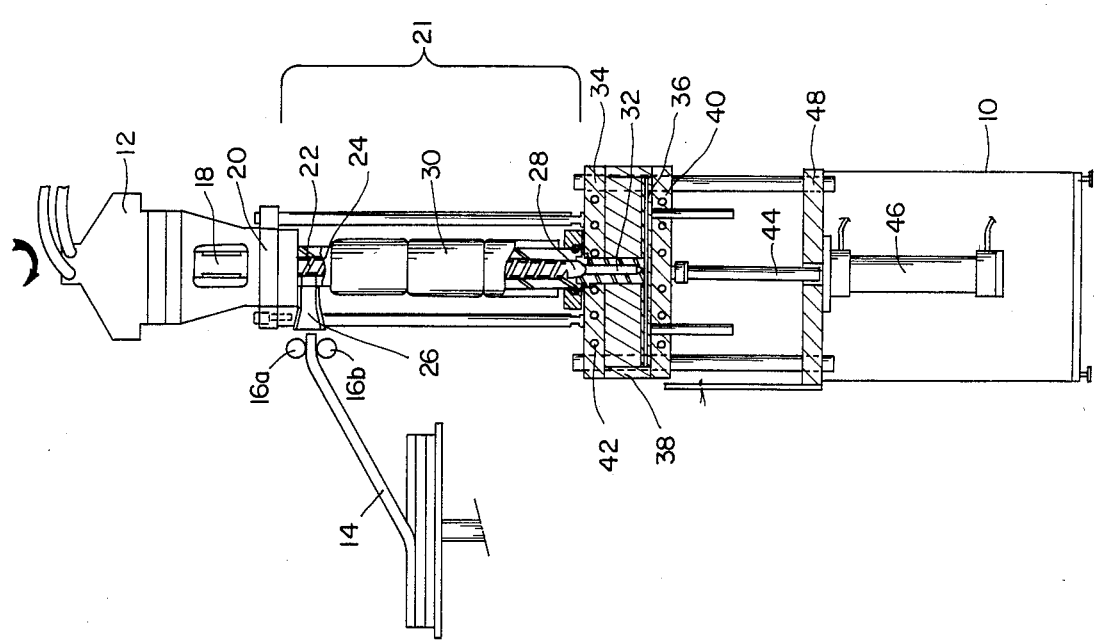

Turning first to FIG. 1 there is shown an elevational view of the apparatus of the present invention having a support base 10 and a variable speed motor 12 arranged to provide selective turning speeds to the extruder more fully described below. As further shown, a continuous coil or strip of raw rubber material 14 is arranged for continuous feed into the extruder through guide rollers 16a and 16b. This raw material may also be fed into the machine in the form of pellets, granules or powder, all of which are commerically available as raw material for rubber molding.

In the preferred embodiment of the present invention, the drive shaft 18 of the hydraulic motor is arranged to protrude through the bearing housing 20 which is the preferred embodiment also includes a coupling (not shown) to connect the motor to an extrusion unit 21 consisting of a screw-threaded shaft 22 enclosed within a cylinder 24. The raw rubber is fed into this enclosed screw extruder at the inlet 26 and transported to the lower discharge extremity 28 of the extruder upon the rotation of the shaft 22. In the preferred embodiment of the present invention there is provided a gradual reduction in the diameter of the extrusion chamber from the inlet to the discharge extremity 28, whereby the rubber is compressed as it is moved from the inlet to the discharge. During this compression, heat is generated whereby the rubber is heated in preparation for the molding operation. Further, during the screw motion of the extruder, the contact of the rubber against the screw and the walls of the enclosing cylinder mixes the rubber to create a homogenous mixture of uniform temperature.

For further controlling the temperature of the rubber material, heating bands 30 are provided surrounding the extrusion cylinder. These may be heated by electrical or fluid means and are arranged to transfer heat to the rubber as it contacts the enclosing extruder cylinder.

On exit from the extruder cylinder the heated and plasticized rubber is forced through the communicating opening 32, through the top bolster 34 and into the expanding cavity or pot 36. This pot is defined by upwardly extending sidewalls 38 and the moving bolster 40. Both the top bolster and moving bolster may employ heating means 42 to further heat or maintain the temperature of the plasticized rubber. The moving bolster is held in position by the shaft 44 of the hydraulic or pneumatic cylinder 46 mounted to the bottom bolster 48 on the support base.

Figure 2:
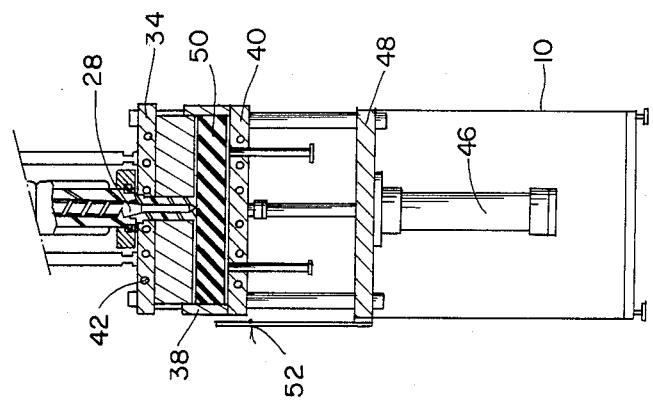

Turning now to FIG. 2, there is shown the lower portion of the apparatus of FIG. 1 having the pot filled with plasticized and heated rubber 50. Moreover, the moving bolster has been displaced downwardly to trigger sensor switch 52 which is mounted at a selected height to regulate the volume of the prepared rubber desired. The displacement of the moving bolster causes the hydraulic cylinder shaft to be displaced a corresponding amount. By controlling the pressure applied by the hydraulic cylinder an adjustment of the back pressure against the extruder is provided thereby causing an adjustment of the heating generated within the screw extruder.

Figure 3:
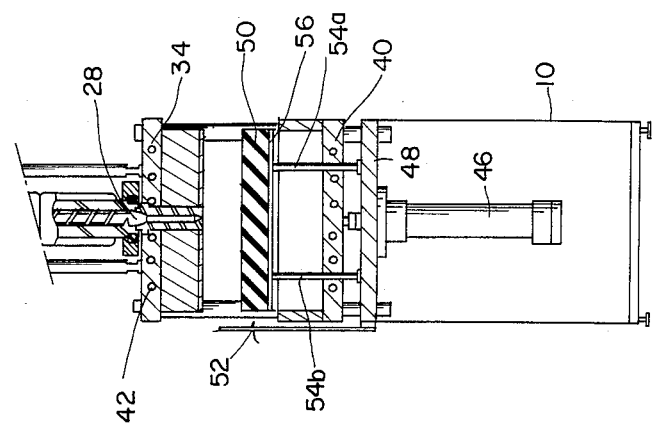

Turning now to FIG. 3, the plasticized and heated rubber is shown being released from the pot cavity. The moving bolster 40 has been displaced to its lowest extremity causing the lift pins 54a and 54b to contact the bottom bolster 48 and thereby force the Teflon-coated plate 56 lining the bottom of the pot cavity upward to separate the plasticized rubber from the moving bolster. In this position the prepared rubber is accessible for removal from the rubber preparation machine for placement into the molding press.

I claim:

1. In a method of molding rubber articles comprising steps of transferring uncured rubber to a mold cavity and curing the rubber in the cavity to form a molded rubber article, the improvement comprising preparing the uncured rubber by extruding the rubber into an expandable chamber and controlling the pressure within said chamber to thereby regulate the temperature of the rubber whereby a measured amount of heated uncured rubber is produced for transfer to a mold cavity.

2. The method of molding a rubber article of claim 1 further comprising the step of providing external heat to the rubber while passing the rubber through the extruder.

3. The method of molding a rubber article of claim 2 further comprising the additional step of passing the extruded rubber through a heater unit to impart additional heat to the rubber.

4. The method of molding a rubber article of claim 3 whereby the quantity of extruded rubber is measured by sensing movement of an expandable chamber.

5. The method of molding a rubber article of claim 4 wherein said chamber pressure is controlled by application of pressure through a hydraulic cylinder controlled platform representing part of the chamber.

6. An improved apparatus for preparing rubber for a molding process comprising:

an extruder having an inlet for insertion of raw rubber stock at a first end thereof and having an outlet at the opposite end thereof for discharge of extruded rubber, wherein said extruder has a threaded shaft arranged for rotation within a housing, whereby rubber stock is transported from said inlet to said outlet, and further comprises a decreasing diameter of said shaft and housing whereby compression and heating of said rubber is caused thereby during the transport of said stock; and an expandable chamber arranged to receive said extruded rubber, and having a hydraulic cylinder controlled platform representing part of said chamber to control pressure therein.

7. The apparatus of claim 6 further comprising sensing means for detecting a predetermined expansion of said chamber.

8. The apparatus of claim 7 further comprising means adjacent to said extruder housing for transmitting additional external heat to said rubber within said extruder.

9. The apparatus of claim 8 further comprising means adjacent to said outlet of said extruder for transmitting additional external heat to said rubber discharged therefrom.

* * * * *